United States Patent
Lietaer

(10) Patent No.: US 9,814,177 B2
(45) Date of Patent: Nov. 14, 2017

(54) RESEEDING DEVICE

(71) Applicant: Eliet NV, Otegem (BE)

(72) Inventor: Frederic Lietaer, Otegem (BE)

(73) Assignee: Eliet NV, Otegem (BE)

(*) Notice: Subject to any disclaimer, the term of this patent is extended or adjusted under 35 U.S.C. 154(b) by 0 days.

(21) Appl. No.: 15/029,315

(22) PCT Filed: Oct. 17, 2014

(86) PCT No.: PCT/IB2014/065407
§ 371 (c)(1),
(2) Date: Apr. 14, 2016

(87) PCT Pub. No.: WO2015/056235
PCT Pub. Date: Apr. 23, 2015

(65) Prior Publication Data
US 2016/0227702 A1    Aug. 11, 2016

(30) Foreign Application Priority Data
Oct. 17, 2013  (BE) .................................. 2013/0697

(51) Int. Cl.
*A01C 7/00*    (2006.01)
*A01B 45/00*   (2006.01)
(Continued)

(52) U.S. Cl.
CPC .............. *A01C 7/205* (2013.01); *A01B 45/00* (2013.01); *A01B 45/026* (2013.01); *A01B 49/04* (2013.01);
(Continued)

(58) Field of Classification Search
CPC combination set(s) only.
See application file for complete search history.

(56) References Cited

U.S. PATENT DOCUMENTS 3,083,652 A * 4/1963 Brettrager ................ A01C 7/00
                                                 111/8
3,247,812 A * 4/1966 Luciano ............... A01B 45/026
                                                 111/133
(Continued)

FOREIGN PATENT DOCUMENTS

DE   9012550 U1   11/1990
EP   0485916 A1    5/1992
EP   0861579 A1    9/1998

*Primary Examiner* — Alicia Torres
(74) *Attorney, Agent, or Firm* — James Creighton Wray; Meera P. Narasimhan

(57) ABSTRACT

The present invention relates to a reseeding device (1) configured for introducing grass seeds into an existing turf, comprising a rotatable shaft (2) which is provided with a number of blades (3) along its length which are at right angles to the shaft (2) and which are configured for cutting furrows into the turf and loosening and removing parts of the turf, a seed distributor (4) configured for spreading grass seeds at least in the furrows produced, in which the device (1) is configured, in use, to discharge the material loosened by the blades (3) over the shaft (2) and the seed distributor (4), along a direction (A) opposite to the direction of travel, so that the scattered grass seeds are at least partly covered by the loosened material. A reseeding device (1) of such design has the significant advantage that the loosened material does not form an impediment during reseeding.

12 Claims, 4 Drawing Sheets

(51) Int. Cl.
  *A01B 45/02* (2006.01)
  *A01B 49/04* (2006.01)
  *A01B 49/06* (2006.01)
  *A01C 7/20* (2006.01)
  *A01C 5/06* (2006.01)
  *A01C 7/08* (2006.01)

(52) U.S. Cl.
  CPC ............ *A01B 49/06* (2013.01); *A01B 49/065* (2013.01); *A01C 5/064* (2013.01); *A01C 7/008* (2013.01); *A01C 7/082* (2013.01)

(56) References Cited

U.S. PATENT DOCUMENTS

| | | | | |
|---|---|---|---|---|
| 3,915,343 | A * | 10/1975 | Barcock | A01C 15/006 111/200 |
| 6,024,033 | A * | 2/2000 | Kinkead | A01C 7/008 111/11 |
| 6,036,406 | A | 3/2000 | Rexius | |
| 6,347,593 | B1 * | 2/2002 | Moran | A01B 45/00 111/133 |
| 8,944,175 | B2 * | 2/2015 | Barger | A01B 45/026 172/120 |
| 2008/0164040 | A1 * | 7/2008 | Kraaijeveld | A01B 45/026 172/21 |
| 2008/0229987 | A1 * | 9/2008 | Dryden | A01G 1/12 111/178 |

* cited by examiner

_US 9,814,177 B2_

RESEEDING DEVICE

This application claims the benefit of Belgian Application No. BE-2013/0697 filed Oct. 17, 2013, and PCT/IB2014/065407 filed Oct. 17, 2014, International Publication No. WO 2015/056235, which are hereby incorporated by reference in their entirety as if fully set forth herein.

The present invention relates to a reseeding device configured for introducing grass seeds into an existing turf, comprising a rotatable shaft which is provided with a number of blades along its length which are arranged at right angles to the shaft and which are configured for cutting furrows into the turf and loosening and removing parts of the turf, a grass seed reservoir and a seed distributor configured for spreading grass seeds from the grass seed reservoir at least into the furrows produced.

Keeping a lawn in good order is not easy. A rainy spring or a dry summer can quickly lead to poor turf which becomes overgrown with weeds or moss. If an ageing or deteriorated lawn has to be renewed, the turf may be removed and the grass may be sown again or sods may be laid. However, this is a very drastic, laborious and, above all, expensive solution. An alternative would be to reseed a lawn at regular intervals.

Reseeding may be regarded as a rejuvenation treatment for a lawn in which new grass seeds are introduced into an existing turf. It is known to cut shallow (±15 mm.) furrows into the lawn soil by means of blades, into which the grass seeds are then placed by hand. A drawback thereof is the fact that when the furrows are being cut, earth and plant remains are thrown up which immediately cover up the furrows again before seeds have been placed in the furrows. There are also commercially available "refined scarifying devices" which spread the grass seeds in front of the scarifier blades. However, with this way of operating, the grass seeds will often be damaged by the rotating blades. In order to prevent such damage, devices are commercially available in which the seed distributor is situated behind the blades. Such devices also throw up earth and plant remains, as a result of which the seeds often end up on top of the cut-out material, as a result of which the chances of success are disappointingly low.

Some years ago, the patent proprietor developed and marketed a reseeding device which cuts 3 mm wide and shallow (±15 mm) furrows in the lawn soil using mechanically driven and overtop rotating blades in order to achieve a good reseeding treatment. So as to prevent the cut-out material from covering the furrows, this device is provided with a collecting tray at its front side to collect the cut-out (loosened) material which is projected in the direction of the front side of the device via the blades. With this device, the seed reservoir is fitted just behind the blade shaft. Openings are provided underneath this seed reservoir which are in line with the blades. As soon as the seed closure flap opens according to the set flow rate, the mill in the seed container ensures that the seeds are scattered synchronously with the driving speed. Out of necessity, the seeds end up on and in the furrows produced as a result, which maximises the chances of successful germination. The device is furthermore provided with a roller in order to close the furrows again.

In a second alternative design by the patent proprietor, a discharge duct was provided behind the blade shaft in a similar machine, in which the loosened (cut-out) material was collected and discharged to the side by means of a conveying system. In this way, the loosened material does not cover up the furrows which have just been produced, so that a seed distributor which is fitted behind this collecting duct spreads the seeds in the furrows. The furrows are closed again by a roller in this case as well.

The above-described device of the patent proprietor produces very good results, but has the drawback that the device is too large and too expensive to buy for a number of users. This means that the technique of reseeding is less accessible to garden contractors.

Another solution is described in European patent publication EP 0 485 916. This publication describes a reseeding device configured for introducing grass seeds in an existing turf, comprising a rotatable shaft which is provided with a number of blades along its length which are at right angles to the shaft for cutting furrows in the turf and loosening and removing parts of the turf, a grass seed reservoir with an outlet opening (slot) configured for spreading grass seeds at least in the furrows produced. The device described in EP 0 485 916 is furthermore configured to discharge the material loosened by the blades over the grass seed reservoir, along a direction opposite the direction of travel, so that the scattered grass seeds are at least partly covered by the loosened material. However, this device has the drawback that the volume taken up by the grass seed reservoir forms an obstacle to the loosened material. For this reason, the device in question is provided with a (hingable) guide tube with a bend which is positioned in such a way that the loosened material will pass over the seed reservoir. However, at the location of the bend, the guide tube will often become clogged with loosened material, as a result of which the reseeding will have to be interrupted at regular intervals in order to clean the device. Furthermore, the space which is provided for the grass seed reservoir is limited, as a result of which the volume of the reservoir has to be limited. As a result thereof, work has to be interrupted regularly in order to replenish the seeds in the reservoir, in which case the guide tube also has to be (hingedly) moved in order to reach the grass seed reservoir, which requires additional effort.

It is an object of the present invention to provide a reseeding device which is more compact, simple, lightweight and less expensive and which can, in addition, be operated for a certain time without having to interrupt work in order to clean or replenish the grass seed store.

The object of the invention is achieved by providing a reseeding device configured for introducing grass seeds in an existing turf, comprising a rotatable shaft which is provided with a number of blades along its length which are arranged at right angles to the shaft and which are configured for cutting furrows in the turf and loosening and removing parts of the turf, a grass seed reservoir and a seed distributor configured for spreading grass seeds coming from the grass seed reservoir at least in the furrows produced, in which the device is configured, in use, to discharge the material loosened by the blades over the shaft and over the seed distributor, along a direction opposite to the direction of travel, so that the scattered grass seeds are at least partly covered by the loosened material. A reseeding device which is configured in this way has the significant advantage that the grass seed reservoir does not form an obstacle for the loosened material, because of the grass seed reservoir/seed distributor system only the seed distributor is provided underneath the projection arc of the material loosened by the blades. In addition, the presence of a collecting system is no longer required, as a result of which the device can be made more compact. Since the seed reservoir is detached from the seed distributor, only the seed distributor has to be fitted in the space underneath the projection arc of the loosened material and there are no longer any limitations with regard to the volume of the seed reservoir. As a result thereof, it is possible to provide a much larger reservoir which consequently has to be replenished less often. With the device according to the invention, the seed reservoir can even be replenished during use. In general, it can be stated that with the reseeding device according to the invention, the size of the grass seed reservoir does not impede the satisfactory operation of the device, whereas it does with the device described in EP 0 485 916.

Preferably, the device according to the invention is configured, in use, to discharge the material loosened by the blades in the zone which extends at least partly underneath the grass seed reservoir (or a continuation thereof) and above the seed distributor. In particular, the device is configured, in use, to discharge the material loosened by the blades over the shaft and between the grass seed reservoir and the seed distributor.

Due to the fact that, as is indicated above, with the device according to the invention only the seed distributor has to be provided underneath the projection arc of the material loosened by the blades, which only takes up a limited volume as such, the loosened material can be projected away according to a flatter path (curve) than is the case with the system described in EP 0 485 916. Due to the flatter projection arc, the risk of blocking is also greatly reduced and, due to the limited volume of the seed distributor, the device can also be made much more compact.

The seed distributor preferably has a width which at least corresponds to the working width of the blades. This partly ensures that all furrows are provided with grass seeds.

In a preferred embodiment of the reseeding device according to the invention, the shaft is rotatable opposite to the direction of travel. Due to the fact that the shaft and thus also the blades on the shaft will, in use, rotate in this direction, part of the loosened material will already be discharged backwards over the shaft and the seed distributor downstream thereof. In order to also ensure that the part of the loosened material which is projected forwards (along the direction of travel) is discharged in the correct direction, in particular backwards, a more preferred embodiment of the reseeding device according to the invention comprises a curved front wall which is configured to guide at least a part of the loosened material in a direction opposite to the direction of travel. By designing the reseeding device in this way, virtually all of the loosened material is discharged in the direction of the rear of the device.

According to a more preferred embodiment of the device according to the invention, the seed distributor comprises a number of outlet openings for grass seeds, and at least one conveyor screw which is configured to convey the grass seeds through the seed distributor along said openings. In particular, the seed distributor comprises adjacent first and second conveyor screws, in which the first screw is configured to convey the grass seeds over the outlet openings from one side of the seed distributor to the other side, and in which the second screw is configured to transport grass seeds which have not been scattered back.

According to a more particular embodiment of the reseeding device according to the invention, the seed distributor comprises a fan configured to generate an air flow which is capable of projecting the grass seeds in the direction of the turf. Due to this air flow, the grass seeds receive an additional acceleration while they fall, as a result of which they are pushed more forcefully into the furrow. In addition, this air flow ensures that no undesired accumulation of seeds can occur in the seed distributor.

In a preferred embodiment, said outlet openings are provided in seed funnels extending towards the turf.

According to a most particular embodiment of the device according to the invention, the grass seed reservoir comprises a partition wall, so that a part of the reservoir can be used for storing grass seeds and another part of the reservoir can be used for storing a different material. The partition wall is preferably displaceable, so that the volume of the parts can be changed. By using a reservoir of such a design, it becomes possible, for example, to introduce grass seeds and another material, such as e.g. fertilizer, lime or the like, into the ground simultaneously. In the devices provided with a reservoir of such design, the two materials are well mixed in the seed distributor, so that a homogenous mixture can be spread out.

In an advantageous embodiment of the reseeding device according to the invention, said device is provided with a pressure-exerting roller configured to tamp down the scattered seeds. The pressure-exerting roller in question is preferably provided with a rubber layer to reduce damage to the scattered grass seeds. The pressure-exerting roller is placed just behind the seed distributor. The scattered grass seeds are tamped down into the ground by this roller before being covered by the loosened material.

In a most particular embodiment of the reseeding device according to the invention, the rotatable shaft furthermore comprises a number of carrier bodies along its length which are provided with a number of radially extending wing elements on their periphery which, in use, generate an air displacement. The generated air displacement will ensure that the loosened material is discharged more easily and in particular more quickly. Preferably, the wing elements are made from a flexible and bendable material, such as e.g. nylon.

In order to further explain the properties of the present invention and to indicate additional advantages and features thereof, a more detailed description of the reseeding device according to the invention is given below. It will be clear that nothing in the following description can be interpreted as a limitation of the protection as laid down by the claims.

In this description, reference numerals are used to refer to the attached drawings, in which:

DETAILED DESCRIPTION

At present, a relatively large number of private lawns suffer from quality issues. The turf is often old and has become overgrown with weeds and moss. Currently, this is still too often being treated by means of herbicides, but these only combat the symptoms and do not really tackle the problems at the root. Reseeding, however, restores the vitality and plant density of the turf, as a result of which there is less chance of weeds and other parasites growing. The effects of reseeding lower the average age of the lawn vegetation, as a result of which it becomes more resistant to unfavourable environmental factors, such as drought, excessive rain . . . . The effects of reseeding have a long action which lasts for years. Reseeding is thus a way of treating lawns which prevents or reduces the use of harmful chemicals. Thus, it is important for the environment to spread the technique of reseeding as widely as possible.

Professional greenkeepers regard reseeding as one of the most essential treatments for a healthy lawn, but it is still missing from the packages which gardeners offer their clients these days. Although the latent need for reseeding private lawns is significant, a private person will never ask his gardener about it, due to ignorance. As a result thereof, many garden contractors underestimate the amount of demand in the market and hesitate to invest in this technique. Since professional reseeding machines which are commercially available nowadays are quite expensive, this only increases the reluctance to adopt reseeding as the way forward.

The reseeding device (1) according to the invention makes it possible to bring high-tech reseeding to the masses and thus makes it more accessible to a wider audience of garden contractors and private individuals and in this way can also raise the general quality of lawns in an ecological way.

Figure 1:
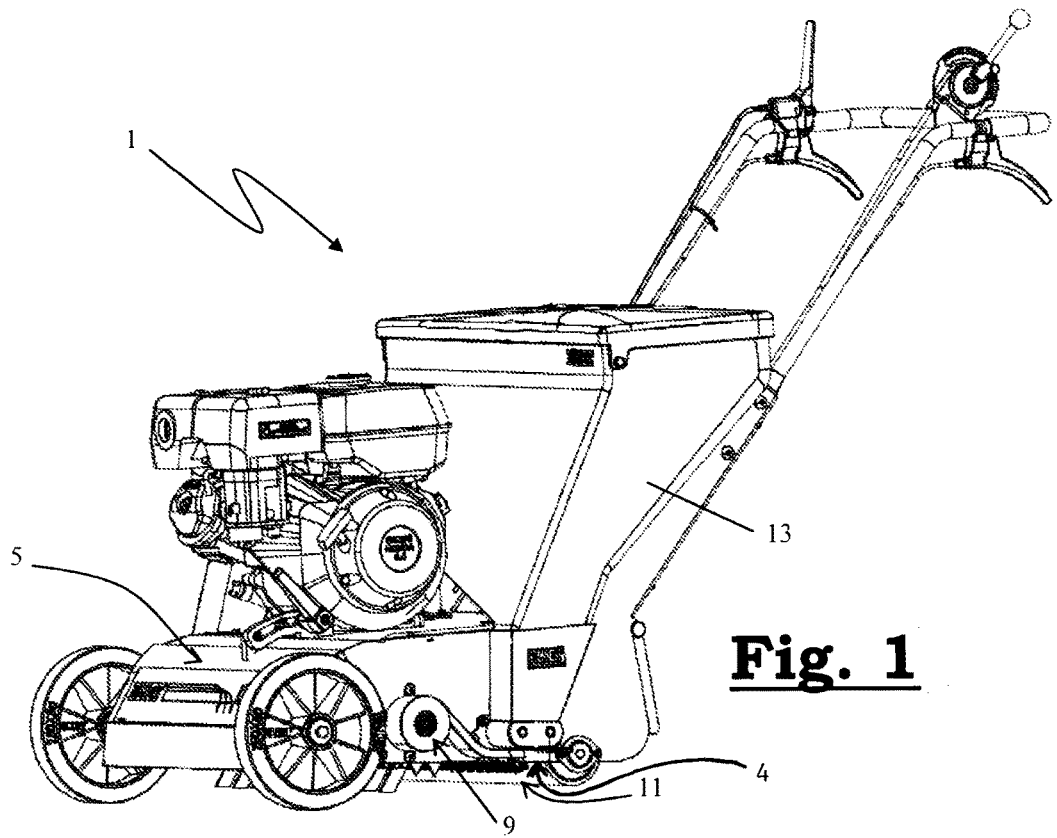
FIG. 1 shows a perspective view of the reseeding device according to the invention.

The reseeding device (1) according to the invention as illustrated, inter alia, in FIG. 1, is provided with rotatable blades (3) which cut furrows in the ground. The blades (3) are provided on a rotatable shaft (2) and rotate counter to the direction of travel. The device (1) furthermore comprises a seed distributor (4) which is configured to spread grass seeds, at least in the furrows produced. The grass seeds come from a grass seed reservoir which is connected to the seed distributor (4) via an outlet downpipe (16) which is provided on the underside of the reservoir (13).

Figure 2:
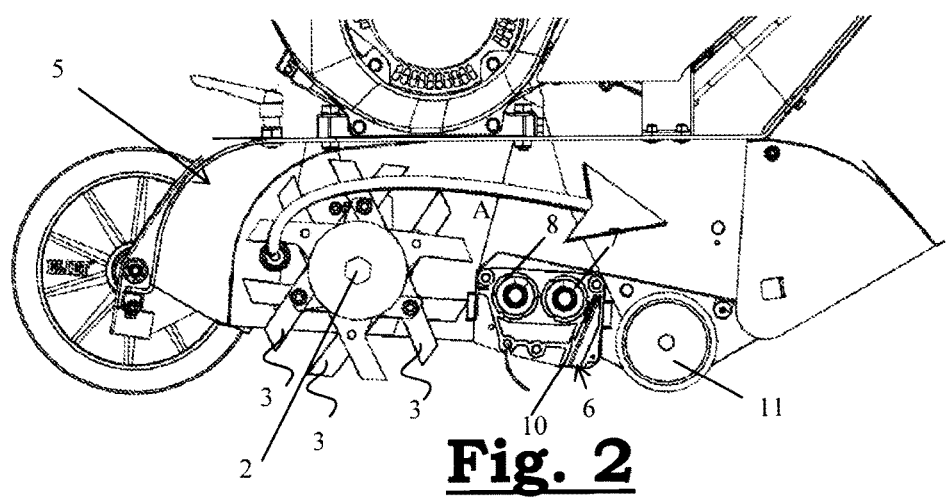
FIG. 2 shows the launch direction and the trajectory (project arc) which material loosened by the blades follows.
Figure 3:
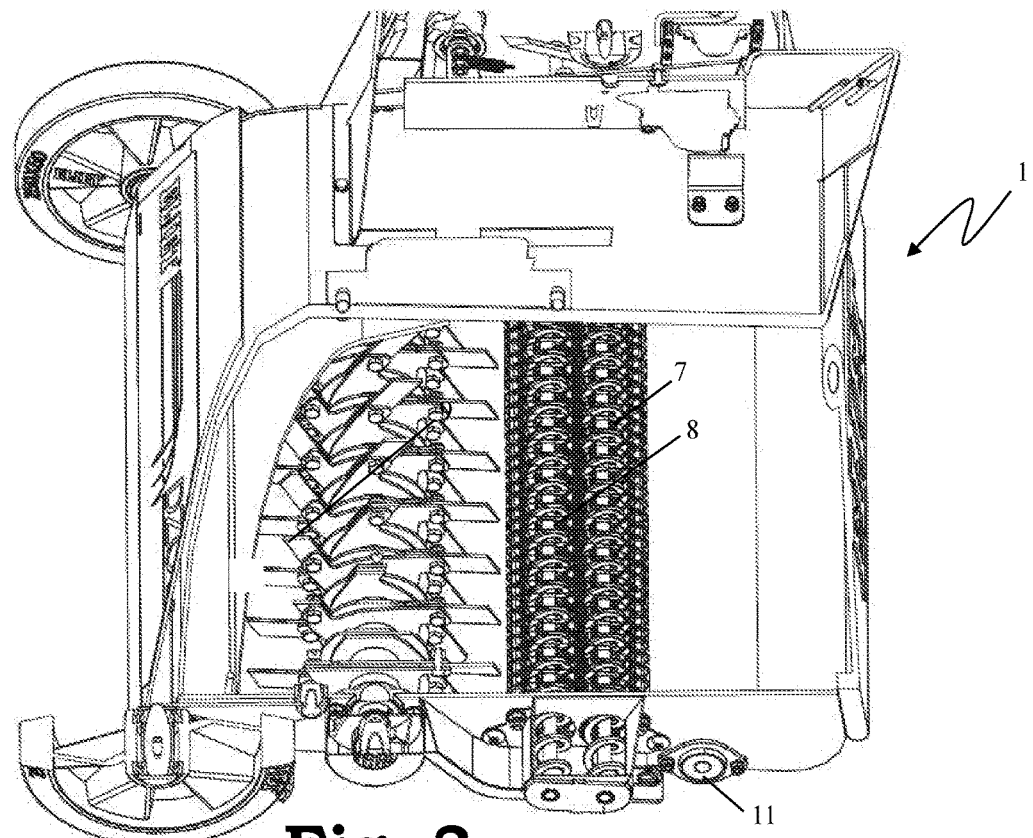
FIG. 3 shows a part of a reseeding device in which part of the housing has been removed so that a part of the inside of the device is visible.
Figure 6:
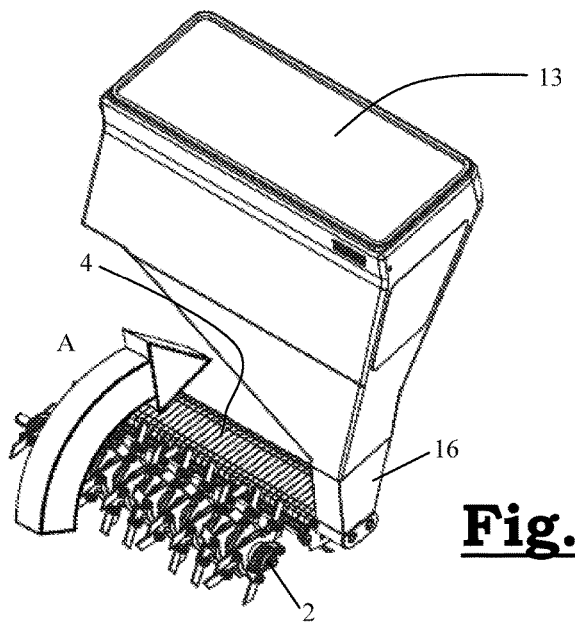
FIG. 6 shows the discharge of the material loosened by the blades over the shaft and via the space between the grass seed reservoir and the seed distributor.

Due to the fact that the shaft (2) and thus also the blades (3) on the shaft (2) will, in use, rotate counter to the direction of travel, a part of the loosened material will already be discharged backwards over the shaft (2) and inter alia over the seed distributor (4) placed downstream thereof. In order to also discharge that portion of the loosened material which is projected forwards (according to the direction of travel) into the correct direction, in particular backwards, the reseeding device (1) according to the invention and as can be seen in the attached figures comprises a curved front wall (5) which is configured to guide at least a portion of the loosened material in a direction opposite to the direction of travel. In FIGS. 2 and 6, the trajectory which the loosened material follows is indicated by arrow (A). By designing the reseeding device (1) in this way, virtually all the loosened material is discharged in the direction of the rear of the device (1).

Since, in the device (1) according to the invention, the grass seed reservoir (13) and the seed distributor (4) are two separate parts which are connected to each other via an outlet downpipe (16), the reservoir (13) no longer has to be positioned underneath the trajectory arc and the loosened material can be discharged in the space between the grass seed reservoir (13) and the seed distributor (4). Such an embodiment offers the advantage that, in contrast to the known systems, the grass seed reservoir (13) can be made much more spacious. The arrangement of the outlet downpipe is chosen in such a manner that the seeds are supplied according to a direction at right angles to the direction in which the seed distributor extends.

Figure 7:
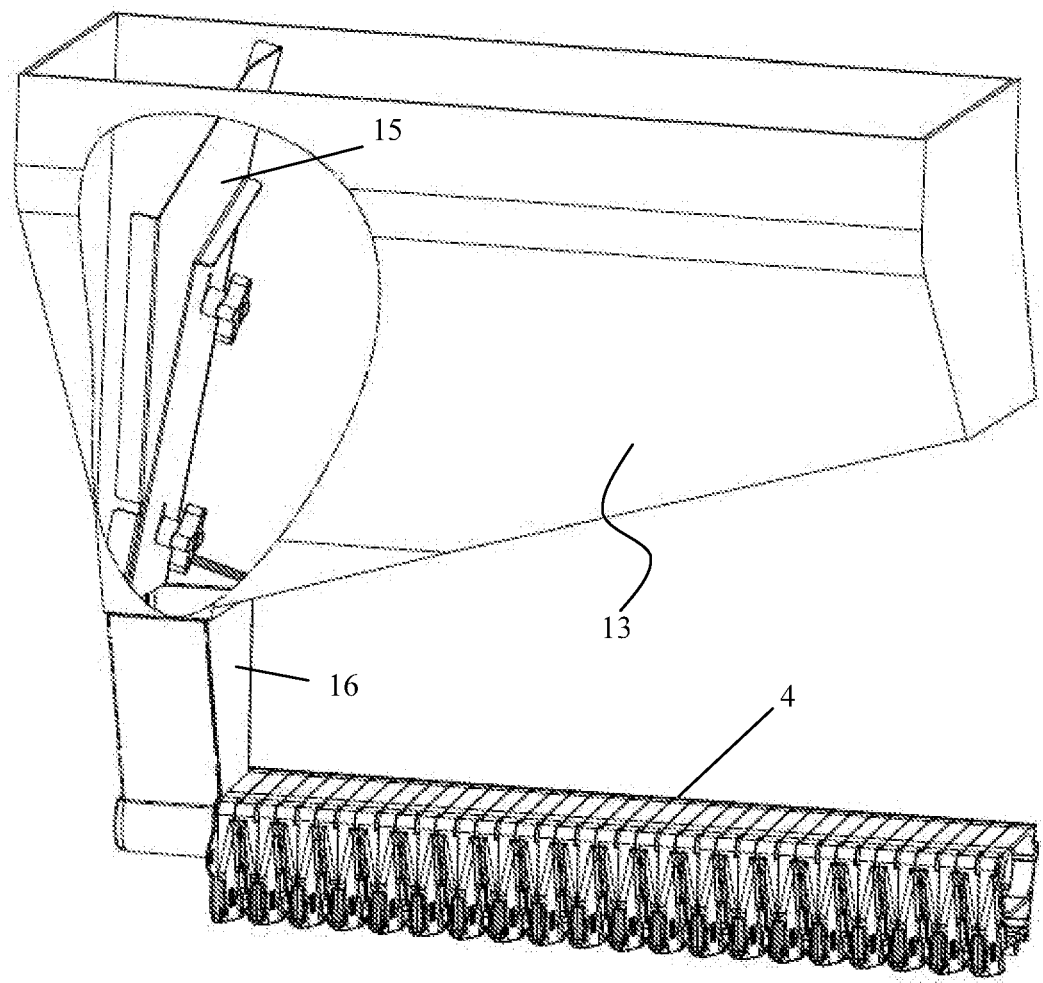
FIG. 7 shows the inside of a grass seed reservoir provided with a displaceable partition wall.

The internal space of the seed reservoir (13) may, if desired, be provided with a partition wall (15) (see FIG. 7). By using a reservoir of such design, it becomes possible, for example, to introduce grass seeds and another material, such as e.g. fertilizer, lime or the like, into the ground simultaneously. The partition wall may be displaceable and may be provided with adjusting means, so that it becomes possible to adapt and adjust the volume of the various compartments, depending on the kind of material which is to be scattered.

Figure 4:
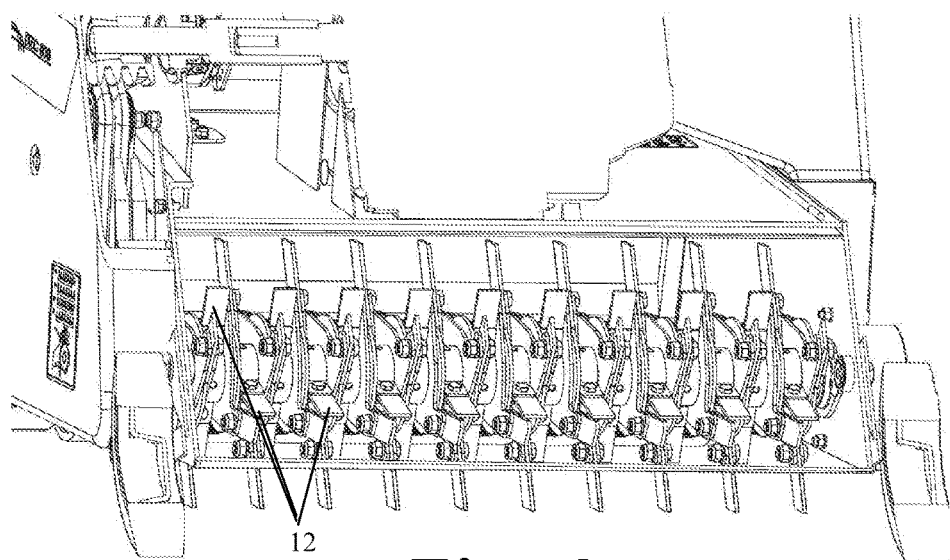
FIG. 4 shows a detail view of the shaft with blades and wing elements.
Figure 5:
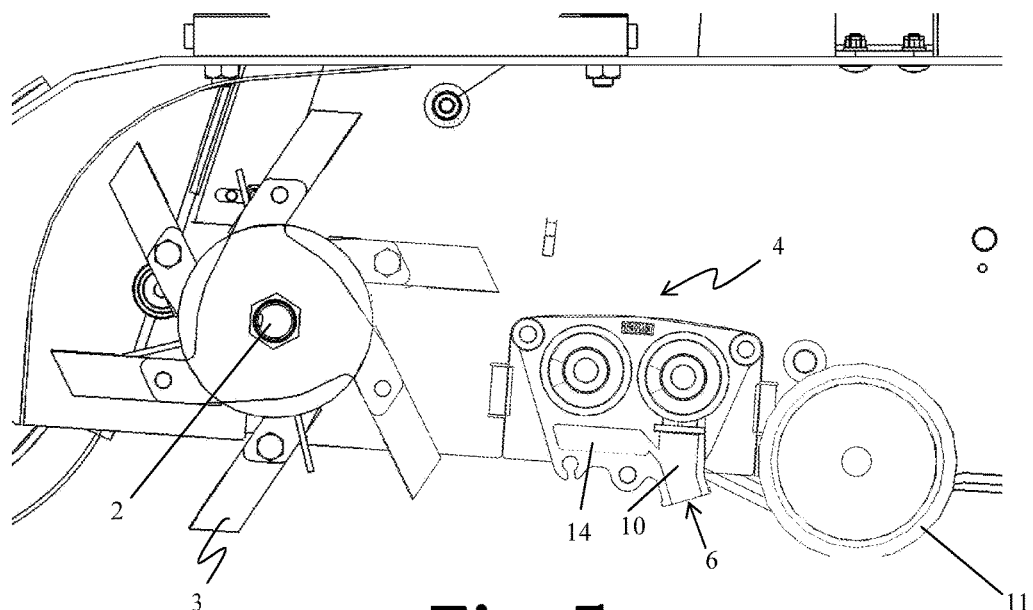
FIG. 5 shows a cross section of the reseeding device according to the invention showing, inter alia, the air duct, the seed funnel with outlet opening and the conveyor screws.

In order to be able to discharge the loosened material even more quickly, the rotatable shaft (2) furthermore comprises a number of carrier bodies along its length which are provided with a number of radially extending wing elements (12) on their periphery which are made from a flexible and bendable material (see FIG. 4 inter alia). In use, such wing elements (12) will generate an air displacement which will ensure that the loosened material is discharged more easily and in particular more quickly.

The sowing/scattering zone is situated behind the blades, but it is important that, with the device (1) according to the invention, the grass seeds are channelled and scattered below the projection flow of the material loosened by the blades, in and around the furrows produced by the blades. Via (adjustable) outlet openings (6) which are provided in seed funnels (10) extending to the ground, the seeds land in and around the furrows produced by the blades (3) and are only covered by the falling waste afterwards. The outlet openings (6) are aligned with the blades. In order to pass the seeds through the limited space underneath the projection arc to the location where they are to be scattered, the seed distributor (4) is provided with a conveyor screw (7) (auger) which is rotatably arranged in a so-called (first) seed duct. The conveyor screw (7) is designed as a hollow spiral and is configured to convey the grass seeds through the seed distributor (4), in particular the first seed duct, along said openings (6). This (first) screw (7) rotates synchronously with the driving speed of the machine (1). The hollow spiral ensures that the seeds still have a substantial amount of freedom of movement in the seed distributor (4) and are not crushed while being conveyed. A second seed duct runs parallel to the first seed duct and again contains an identical conveyor screw (8) (Archimedean screw). However, it rotates in the opposite direction thereto and serves to transport the excess seeds which collect at the end of the first seed duct back to the start and thus close the loop. In order to ensure that the seeds are left in optimum conditions, air is blown onto the seeds as they are being scattered. To this end, a miniature fan (9) or blow turbine is provided which blows air into an air duct (14). This air duct (14) is connected to the seed funnels (10) in which the outlet openings are provided. In this way, the air which flows into the air duct (14) is diverted and blows downwards into the seed funnels (10). The falling seeds are given an additional boost by this injection of air. As a result thereof, it is blown more forcefully onto the ground and into the furrow. In addition, this constant air flow ensures that no accumulation of seeds can occur in the seed funnels (10).

At the rear, the reseeding device (1) runs on a driven and rubber-clad pressure-exerting roller (11). This pressure-exerting roller (11) is positioned immediately behind the seed distributor (4). Thus, the scattered seeds are tamped down into the ground again by the roller. The projected waste resulting from the cutting of the furrows only lands further along on the sown zone. This waste, which mainly consists of soil, neatly covers the seeds, thus in fact forming an additional insulation layer which keeps the seeds moist and protects the germinating grass stalk from drying out.

It is not a matter of course that the reseeding operation will be successful. There are many factors which may cause the operation to fail. Since the grass seeds are sown between the existing vegetation of the lawn, the latter is at the same time a competitor of the germinating and fragile grass stalks. In addition, it should be borne in mind that the lawn has to be mowed again after one and a half week at most. Therefore, the time the grass seeds are give to germinate, grow roots and take root in the ground and develop stalks is thus very limited. In order to maximize the chances of success of this process, the grass seeds preferably have to be introduced under optimum circumstances during reseeding, in order to prevent any loss of time in this race. The reseeding device (1) according to the invention responds to this need. The ideal circumstances for grass seeds to grow are sufficient moisture and heat, and protection from drying out, as this is pernicious for the germ. Moisture is present in the soil, so the better the contact between the seeds and the soil, the better moisture is absorbed and the quicker the germination process starts.

Although in theory (at optimum moisture), the ideal depth below the soil for grass seeds is between 5 to 7 mm, in practice, it is usually preferred to place the seeds slightly deeper in order to reduce the risk of drying out. Therefore, furrows of approximately 15 mm are cut using a reseeding machine in order to achieve this sowing depth. Then, the most important thing is to introduce the seeds as quickly as possible after cutting the furrow, so that no external factors can exert any influence. With the design of this reseeding device (1), the seed distributor (4) was placed as closely as possible to the blades. The seed funnels (10) which guide the seeds thus come so close to the ground that the free drop is only 15 mm. As a result of the scattering openings (6) of the tubes (10) which are only 6 mm wide, a compact stream of seeds is produced which can be spread over the furrow in a highly directed manner. By also blowing air on the seeds, they fall more quickly and more forcefully, as a result of which they do not suffer as much impact from sidewind and are also blown into the furrow more deeply.

As a result of the blade (3) passing through the ground, the soil in and around the furrow is slightly upset. As a result thereof, the contact zone and adhesive power of the soil increases. As a result thereof, the chances of the seeds which fall at the edges of the furrow are improved. The pressure-exerting roller (11) on which the machine (1) travels and which is situated immediately behind the seed distributor (4), tamps these seeds firmly into the loose soil. The blades (3) throw the cut-out (loosened) soil behind them as a result of which the soil describes an arc and flies over the sowing device and travelling roller. This soil ends up on top of the furrows and seeds, which is ideal as in this way the seeds are covered once more. The soil forms a protective layer against drying out. By thus integrating the seed distributor (4) in the device (1), it is ensured that the seeds are introduced into the lawn in a better way. The sequence of operations which can be realised as a result thereof—cutting, seed injection, tamping down and covering—creates important added value for the resowing result.

The device (1) according to the invention is a thorough reseeding machine with excellent to superior sowing results. Someone who buys this machine immediately enters the market segment at a high level. The new seed-distribution concept can be fitted in a very compact manner and makes the dimensions of the machine comparable to those of a professional scarifier. This offers a significant advantage with regard to maneuverability and access, thus increasing its usability also on smaller private lawns. As a result of the simple technology which comprises relatively few moving parts and is easy to maintain, the cost price compared to current professional reseeding machines can be reduced by approximately 25%.

Due to the simple construction of the machine, it can also be used as a scarifier. Thorough scarifying is essential to prepare for reseeding. Since scarifying is already a generally established operation, this device can be more profitable due to this double use.

As the reseeding device according to the invention introduces the seeds under optimum conditions when sowing, the chances of good results with this lawn treatment are much higher, as a result of which the garden contractor is in a win/win situation. An important cost item in the process is the cost of the seeds. The more scattered seeds germinate and grow, the higher his efficiency. In addition, a gardener is always under contract and is remunerated by his client on the basis of results. The better the results, the quicker the invoice is paid, the less "free" improvement work he has to perform and the more future orders he will obtain.

Due to the new concept of sowing underneath the ejection stream of the blades, placing the grass seed reservoir (13) above this ejection stream and blowing air onto released seeds, three important advantages are achieved for the quality of the result. 1) The seeds are placed in the zone in and around the cut furrow with improved and greater precision, thus increasing the speed and chances of germination. 2) The seeds are covered by the soil which was loosened by the blades, as a result of which an additional protection is created for the burgeoning grass and consequently the chances of continued growth are increased. 3) The seed supply can constantly be replenished.

The invention claimed is:

1. Reseeding device (1) configured for introducing grass seeds into an existing turf, comprising a rotatable shaft (2) which is provided with a number of blades (3) along its length which are arranged at right angles to the shaft and which are configured for cutting furrows into the turf and loosening and removing turf material, a grass seed reservoir (13) and a seed distributor (4) configured for spreading grass seeds from the grass seed reservoir (13) at least into the furrows produced, wherein the grass seed reservoir (13) is detachable from the seed distributor (4), wherein the device (1) is configured, in use, to discharge the material loosened by the blades (3) over the shaft (2) and over the seed distributor (4), along a direction (A) opposite to the direction of travel, so that the spread grass seeds are at least partly covered by the loosened material, and wherein the seed distributor (4) comprises a number of outlet openings (6) for grass seeds, and at least one conveyor screw (7, 8) which is configured to convey the grass seeds through the seed distributor (4) along said openings (6).

2. Reseeding device (1) according to claim 1, wherein the device (1) is configured, in use, to discharge the material loosened by the blades (3) in a zone which extends at least partly underneath the grass seed reservoir and above the seed distributor.

3. Reseeding device (1) according to claim 1, wherein the shaft (2) is rotatable counter to the direction of travel.

4. Reseeding device (1) according to claim 1, wherein the device (1) comprises a curved front wall (5) which is configured to guide at least a part of the material loosened by the blades (3) in a direction opposite to the direction of travel.

5. Reseeding device (1) according to claim 1, wherein the seed distributor (4) comprises adjacent first (7) and second (8) conveyor screws, in which the first screw (7) is configured to convey the grass seeds over the outlet openings (6) from one side of the seed distributor (4) to the other side, and in which the second screw (8) is configured to transport grass seeds which have not been spread back.

6. Reseeding device (1) according to claim 1, wherein the seed distributor (4) comprises a fan (9) configured to generate an air flow which is capable of projecting the grass seeds in the direction of the turf.

7. Reseeding device (1) according to claim 1, wherein said outlet openings (6) are provided in seed funnels (10) extending towards the turf.

8. Reseeding device (1) according to claim 1, wherein the grass seed reservoir (13) comprises a partition wall (15) so that a part of the reservoir can be used for storing grass seeds and another part of the reservoir can be used for storing a different material.

9. Reseeding device (1) according to claim 8, wherein said wall (15) is displaceable.

10. Reseeding device (1) according to claim 1, wherein said device (1) is provided with a pressure-exerting roller (11) configured to tamp down the spread seeds.

11. Reseeding device (1) according to claim 1, wherein the seed distributor (4) has a width which at least corresponds to the working width of the blades (3).

12. Reseeding device (1) configured for introducing grass seeds into an existing turf, comprising a rotatable shaft (2) which is provided with a number of blades (3) along its length which are arranged at right angles to the shaft and which are configured for cutting furrows into the turf and loosening and turf material, a grass seed reservoir (13) and a seed distributor (4) configured for spreading grass seeds from the grass seed reservoir (13) at least into the furrows produced, wherein the device (1) is configured, in use, to discharge the material loosened by the blades (3) over the shaft (2) and over the seed distributor (4), along a direction (A) opposite to the direction of travel, so that the spread grass seeds are at least partly covered by the loosened material, wherein the rotatable shaft (2) furthermore comprises a number of carrier bodies along its length which are provided with a number of radially extending wing elements (12) on their periphery which, in use, generate an air displacement.

* * * * *